United States Patent [19]
Russell et al.

[11] Patent Number: 5,216,582
[45] Date of Patent: Jun. 1, 1993

[54] SHOCK MOUNTED DISK DRIVE MODULE HAVING SNAP-LOCK COVER

[75] Inventors: Scott B. Russell, Livermore; Tuan N. Nguyen, San Jose; Marvin P. Milock, San Jose, all of Calif.

[73] Assignee: Quantum Corporation, Milpitas, Calif.

[21] Appl. No.: 832,966

[22] Filed: Feb. 10, 1992

[51] Int. Cl.⁵ .................. H05K 7/14; A47B 81/00
[52] U.S. Cl. .................. 361/395; 312/223.2; 248/638
[58] Field of Search ............ 220/4.01, 4.02, 4.28; 248/345.1, 581, 615, 634, 638; 206/591, 592; 312/223.2, 264, 265.5, 265.6; 361/392, 393, 394, 395, 399, 424, 429; 174/50, 52.1; 369/75.1

[56] References Cited

U.S. PATENT DOCUMENTS

| | | | |
|---|---|---|---|
| D. 311,737 | 10/1990 | Westwood et al. | D14/114 |
| 4,296,907 | 10/1981 | Ishida et al. | 248/634 X |
| 4,560,079 | 12/1985 | Eddleston et al. | 220/4.02 |
| 4,713,714 | 12/1987 | Gatti et al. | 248/581 X |
| 4,777,565 | 10/1988 | McIntosh | 312/265.5 X |
| 4,802,601 | 2/1989 | Pijanowski et al. | 220/4.01 |
| 4,833,554 | 5/1989 | Dalziel et al. | 360/98.04 |
| 4,938,351 | 7/1990 | Lewis | 220/4.01 X |
| 4,941,841 | 7/1990 | Darden et al. | 439/377 |
| 4,976,412 | 12/1990 | Simon et al. | 248/634 |
| 5,041,924 | 8/1991 | Blackborow et al. | 360/69 |
| 5,060,095 | 10/1991 | Rigotti et al. | 360/97.03 X |
| 5,065,262 | 11/1991 | Blackborow et al. | 360/75 |
| 5,099,391 | 3/1992 | Maggelet et al. | 361/395 |
| 5,124,855 | 6/1992 | Dew et al. | 360/97.02 |

FOREIGN PATENT DOCUMENTS

| | | | |
|---|---|---|---|
| 238044 | 3/1960 | Australia | 174/50 |
| 1-266797 | 10/1989 | Japan | 174/52.1 |

OTHER PUBLICATIONS

IBM Technical Disclosure, vol. 5, No. 1, Jun., 1962, p. 8, "Container", Foytlin et al. copy in 174-50.
"Quantum Passport XL", Catalog sheet, Quantum Corporation, ©1991.
"Quantum Prodrive LPS 120/240", Catalog Sheet, Quantum Corporation, Sep. 1991.
Data Sheet, "Quantum Passport XL" Removable Hard Drive ©1991.
Data Sheet "Quantum Prodrive LPS 120/240" Low Profile Series 3½ inch Disk Drives Sep. 1991.

Primary Examiner—Leo P. Picard
Assistant Examiner—Michael W. Phillips
Attorney, Agent, or Firm—David B. Harrison

[57] ABSTRACT

A housing assembly forms a fixed disk drive module for a low profile fixed disk drive shock-mounted therein. A frame defines front and a rear endwalls and two sidewalls. Each sidewall defines on one edge a row of enclosed cover slots having receiving portions and latching portions and on the other edge a row of open cover slot openings including entry portions and latching portions. A top cover and a bottom cover each include two peripheral flanges each defining a series of locking tab formations, one series being sized and aligned to mate in a hinging relation with corresponding ones of the enclosed cover slots and the other series to enter the open cover slot openings as the top cover is rotated toward the frame. The locking tab formations of the covers are adapted to enter and engage the latching portions as the covers are longitudinally displaced relative to the frame to an enclosure position. A front cover includes a locking structure for snap locking to the frame such that when the top cover and the bottom cover are attached to the frame at the enclosure position the covers are thereby locked to the frame. An improved shock mounting arrangement is also disclosed and claimed.

29 Claims, 8 Drawing Sheets

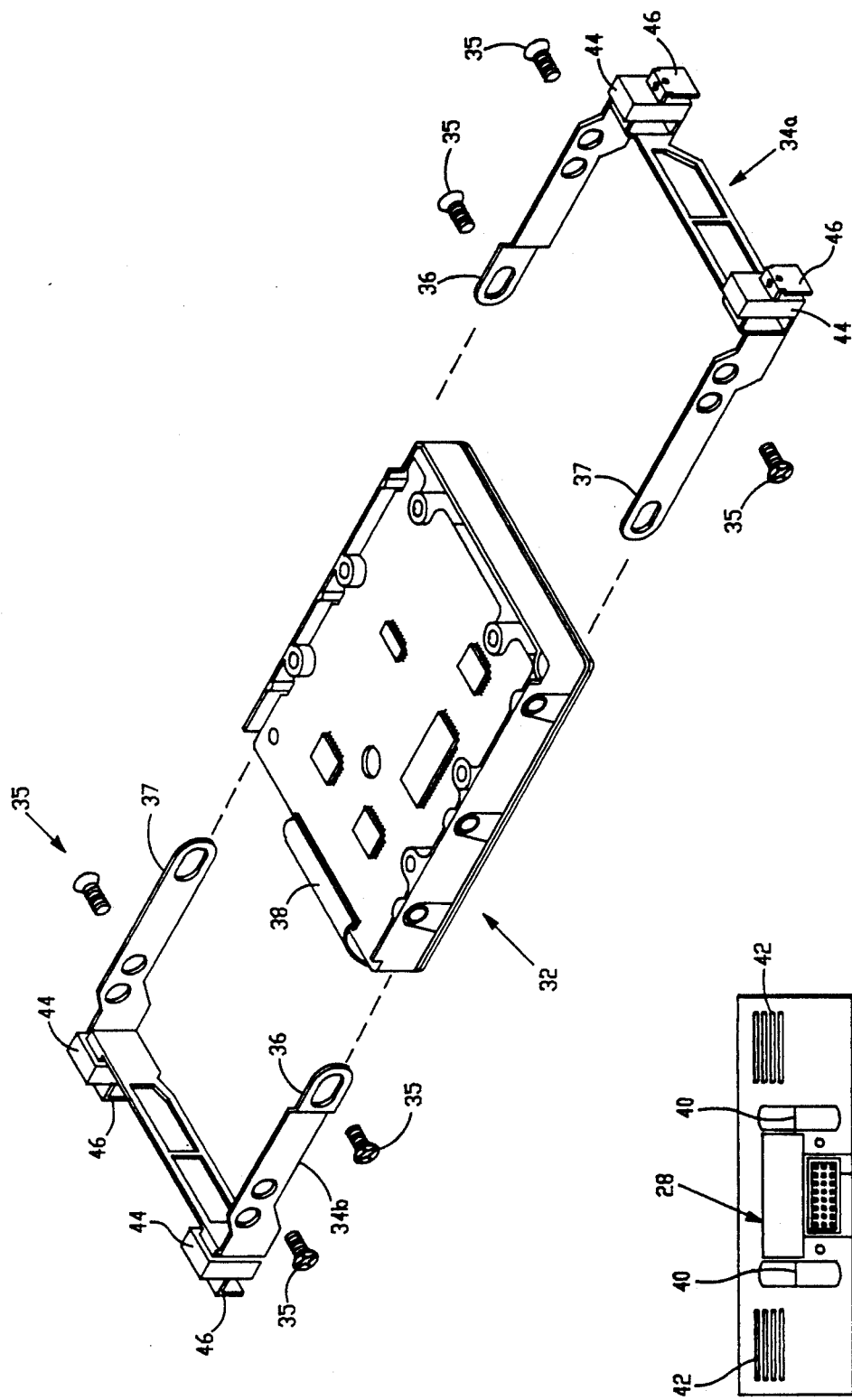

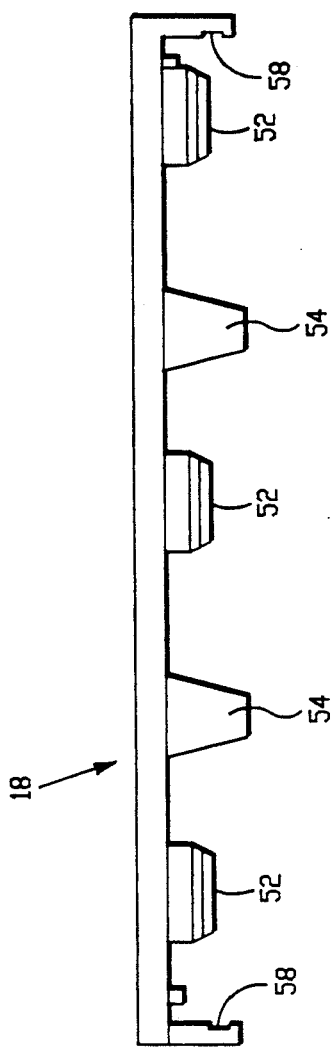
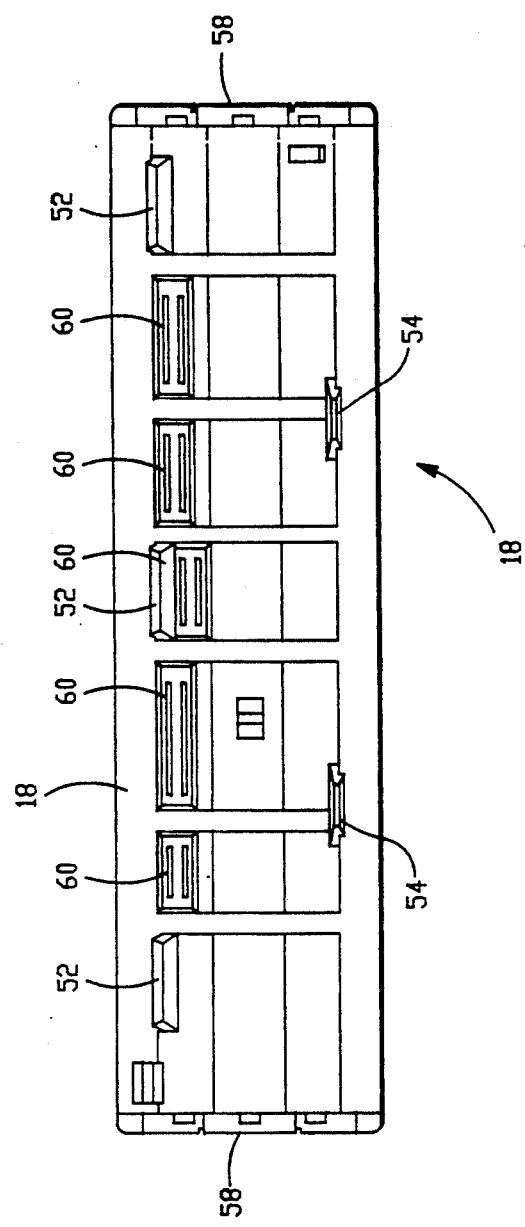
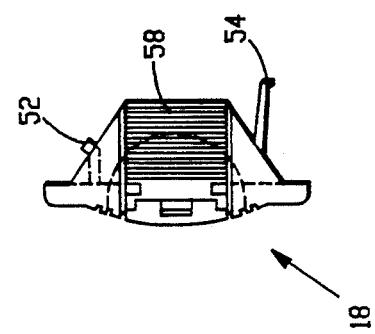

SHOCK MOUNTED DISK DRIVE MODULE HAVING SNAP-LOCK COVER

FIELD OF THE INVENTION

The present invention relates to module-based disk drive data storage subsystems for use within data computing and storage environments. More particularly, the present invention relates to a removable fixed-disk module for a data storage subsystem.

BACKGROUND OF THE INVENTION

Removable and transportable fixed disk drive data storage subsystems are known. Removable modules including fixed disk drives provide a considerable amount of transportable data storage capacity. Thus, customized operating system-application-data base software may be transported by the user from one computer to another, providing both are equipped with compatible receptacle or base units for receiving the module. Also, removable disk drive modules are used where data security is an important consideration. A pertinent example of one form of prior fixed disk drive data storage system is found in the descriptions of commonly assigned U.S. Pat. Nos. 5,041,924 and 5,065,262 to Blackborow et al., both entitled "Removable and Transportable Hard Disk Subsystem"; and, in U.S. Pat. No. Des. 311,737 to Westwood et al., entitled "Removable Hard Disk Drive Module". The disclosures of these prior patents are hereby incorporated herein by reference.

While the module described in the referenced prior patents worked very well, it had certain drawbacks. A principal drawback was that it was assembled and loaded with a head and disk assembly by skilled labor at the factory and did not lend itself to field assembly and configuration. Another drawback was that one of the covers was affixed to a molded plastic frame e.g. by an adhesive. A third drawback was that the module did not lend itself to field configuration and installation of one of a wide variety of low profile fixed disk drives having a uniform overall form factor and various storage capacities. A further drawback was that the shock mounting mechanism employed in the prior module acted in shear with respect to Z-axis force loading (the Z-axis being understood as a force axis normal to the parallel planes of the major data storage surfaces of the storage disk being shock mounted).

These and other drawbacks have been overcome by the present invention.

SUMMARY OF THE INVENTION WITH OBJECTS

A general object of the present invention is to provide a removable fixed disk module for use with a disk-module-based fixed disk data storage subsystem which overcomes limitations and drawbacks of the prior art.

A more specific object of the present invention is to provide a removable fixed disk drive module for a fixed disk drive which may be assembled and disassembled by an untrained person with a minimum of instruction and without any special tooling or materials.

Another specific object of the present invention is to provide a removable disk drive module for a disk drive which permits ready access to the interior thereof while providing a positive snap-lockup arrangement which ruggedly and reliably encloses the disk drive when access is not needed or desired.

One more specific object of the present invention is to provide a removable disk drive module with improved shock mounting for the head and disk assembly, particularly with respect to Z-axis shock forces.

Yet another specific object of the present invention is to provide an improved electrostatic discharge grounding arrangement within a removable disk drive module.

A still further object of the present invention is to provide a ramp locking mechanism in association with one of the covers of a removable disk drive module, thereby to assure that the other cover thereof is first removed by the user in gaining access to an interior space.

In accordance with one facet of the present invention, a fixed disk drive module mounts a low profile fixed disk drive and includes a mounting structure for mounting the fixed disk drive within the module, a frame defining contiguous walls of the module including oppositely facing sidewalls each defining a longitudinal row of enclosed cover slot openings having receiving portions and latching portions and a longitudinal row of open cover slot openings including entry portions and latching portions, a top cover including two peripheral flanges each defining a series of locking tab formations, one series being sized and aligned to mate in a hinging relation with corresponding ones of the enclosed cover slot openings and the other series to enter said open cover slot openings as the top cover is rotated toward the frame, a bottom cover including two peripheral flanges each defining a series of locking tab formations, one series being sized and aligned to mate in a hinging relation with corresponding ones of the enclosed cover slot openings and the other series being sized to enter said open cover slot openings as the bottom cover is rotated toward the frame, the locking tab formations of the top cover and the bottom cover being adapted to enter and engage the latching portions of the sidewalls as the covers are longitudinally displaced relative to the frame to an enclosure position.

In one aspect of the present invention, a front cover is provided and includes a locking mechanism for snap locking to the frame after the covers are attached to the frame at the enclosure position, thereby to lock the covers to the frame.

In another aspect of the present invention, the mounting structure comprises mounting bracket structure secured to the fixed disk drive and having tab formations for engaging tab receptacle structures defined on inside sidewalls of said frame means, said mounting bracket means including shock mounting means between a bracket portion thereof and the tab formations.

In a related aspect of the present invention, the mounting bracket structure comprises a pair of substantially identical U-shaped brackets secured in oppositely facing arrangement to sidewalls of the fixed disk drive.

In a still further aspect of the present invention the frame is formed as a unitary structure of molded plastic material. In this aspect, the locking structure of the front cover preferably includes locking endwall projections for locking to locking ribs defined on exterior sidewall surfaces of the frame means adjacent to the front cover means and may also or alternatively include locking endwall projections for locking to locking ribs defined on exterior sidewall surfaces of the frame adjacent to the front cover.

In another aspect of the present invention, the covers are formed of thin sheet metal, and the locking tab formations comprise a series of inwardly projecting L-shaped segments extending from the cover flanges in a spaced apart arrangement.

As another facet of the present invention, a shock mounting is provided for a disk drive within a removable fixed disk module. The module includes a frame defining contiguous walls of the module including oppositely facing sidewalls, and covers for covering openings surrounded by the contiguous walls of the module, The shock mounting comprises a mounting bracket secured to the disk drive and having tab formations for engaging tab receptacle structures defined on inside portions of the walls of the frame, said mounting bracket including shock mounting elastomeric pads positioned between bracket portions thereof and the tab formations.

As one aspect of this facet of the invention, a tab formation is mounted to the shock mounting pad intermediate the bracket portion, so that the shock mounting pad responds by simultaneous tension and compression stress reaction to forces applied to the module in a direction generally normal to a plane containing a data storage surface of the disk drive.

As a related aspect of this facet of the invention, four tab formations are defined generally adjacent to four corners of the frame.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 3 is a view in elevation of the rear panel portion of a molded plastic frame of the FIG. 1 module.

FIG. 4 is a disassembled view of a low profile disk drive data storage subsystem and of mounting brackets used to mount the drive within the FIG. 1 module.

FIGS. 5A, 5B and 5C are enlarged views respectively of rear elevation, right side elevation and top plan of a front bezel locking bracket of the FIG. 1 module.

DETAILED DESCRIPTION OF A PREFERRED EMBODIMENT

Figure 1:
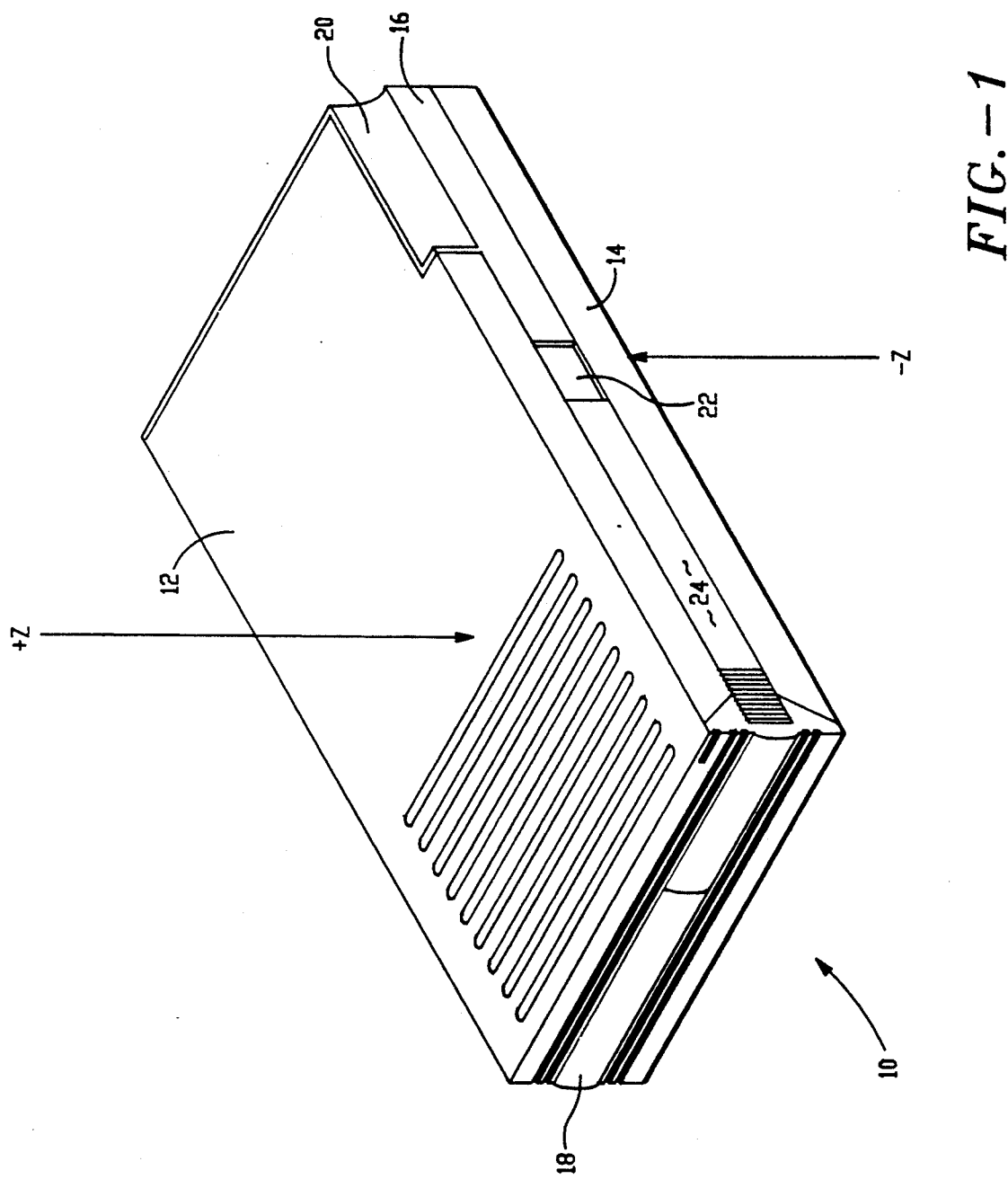
FIG. 1 is an isometric view of a fixed disk drive removable module assembly in accordance with the present invention.

With reference to FIG. 1, a module 10 incorporating principles of the present invention essentially comprises a top cover 12, a bottom cover 14, a frame 16 to which the top cover 12 and bottom cover 14 attach in locking engagement, and a front panel 18 which serves a dual purpose of providing an attractive bezel and of locking the covers 12 and 14 in position relative to the frame 16.

The frame 16 includes a recessed, semi-cylindrical segment 20 which is provided to maintain a clearance between a load/unload motor included within a sidewall of a base unit (not shown) which receives the module. Also, a load pawl engagement recess 22 is defined in a right sidewall 24 of the molded plastic frame 16 for engagement by a load pawl which is linearly displaced as the load/unload motor rotates. A mechanism for loading and unloading the module 10 is shown, for example, in the referenced U.S. Pat. No. 5,041,924, and the particular in-wall load/unload mechanism does not form a part of the present invention. A left sidewall, 26, rear wall 28 and front wall 30 are integrally formed with the right sidewall 24, as by injection molding of a suitable thermoplastic material. Thus, as formed, the frame 16 has the features depicted in FIGS. 2, 6A, 6B, 6C, 6D, 6E, and 7.

When assembled for intended use, as shown in FIG. 1, the module 10 contains e.g. a micro-Winchester disk drive 32 (shown in FIGS. 2 and 4) having a predetermined data storage capacity, and a predetermined form factor, such as a one-inch high, 240 megabyte disk drive of the type described in commonly assigned U.S. patent application Ser. No. 07/762,683 filed on Sep. 19, 1991 and entitled "Low Profile, High Capacity Micro-Winchester Disk Drive", the disclosure of which is hereby incorporated by reference. In most preferred form the drive 32 employs a SCSI interface and thereby may be used with a wide variety of host computing systems. A presently preferred electrical interface for the disk drive 32 is described in commonly assigned, copending U.S. patent application Ser. No. 07/778,446 filed on Oct. 16, 1991, and entitled "Data Storage System Including Removable Hard Disk Drive Module", the disclosure of which is hereby incorporated by reference. In accordance with features of the present invention, the disk drive 32 is shock mounted so that it withstands shock forces, particularly the Z-axis forces, either +Z or −Z as shown in FIG. 1, which otherwise tend to cause the data transducer heads within the disk drive 32 to move vertically relative to the data storage surfaces, the planes of which being normal to the Z-axis shock forces.

Figure 2:
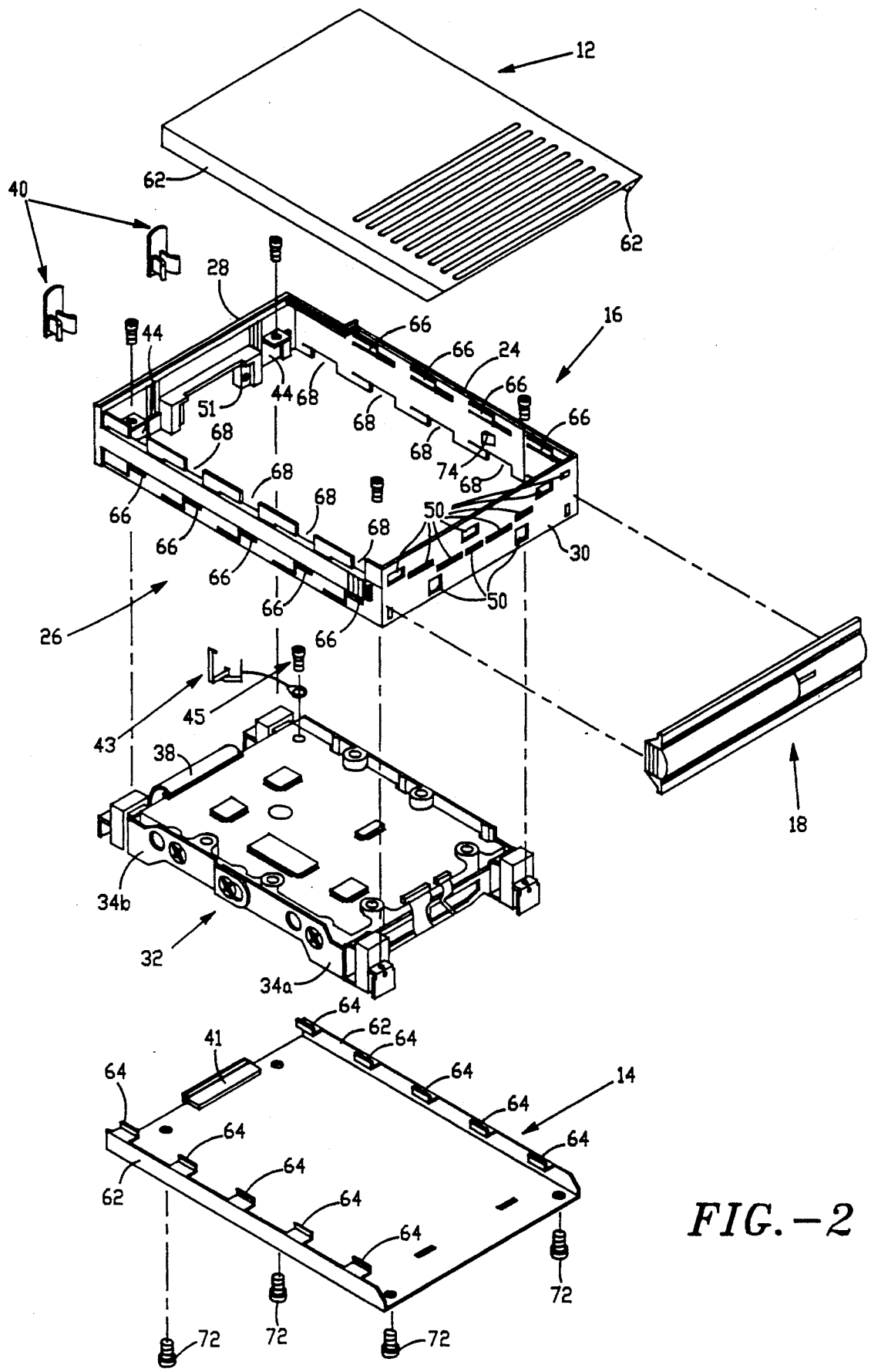
FIG. 2 is a disassembled view of the FIG. 1 fixed disk drive module.
Figure 4A:
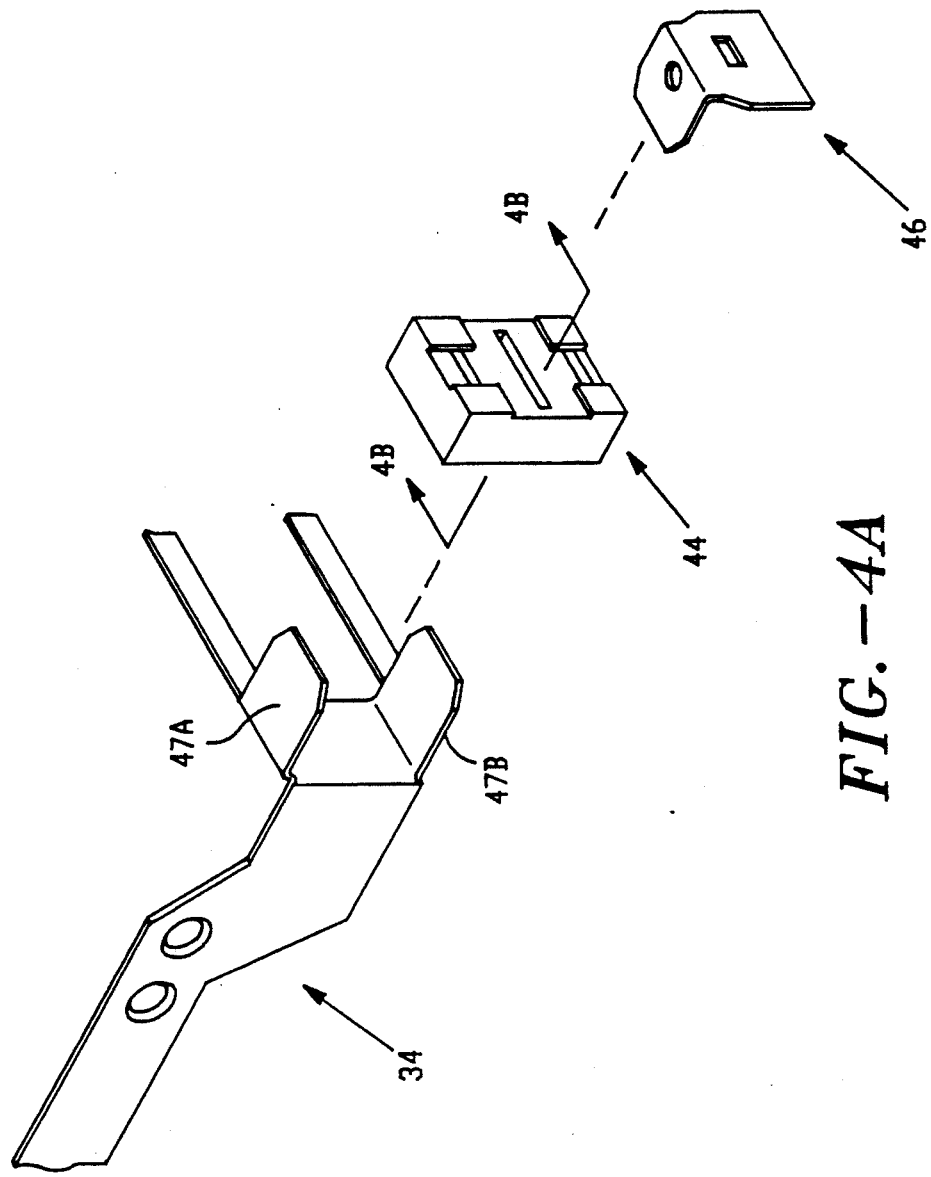
FIG. 4A is an enlarged, exploded view of a portion of one of the FIG. 4 mounting brackets, illustrating shock mounting of the drive in accordance with aspects of the present invention.
Figure 4B:
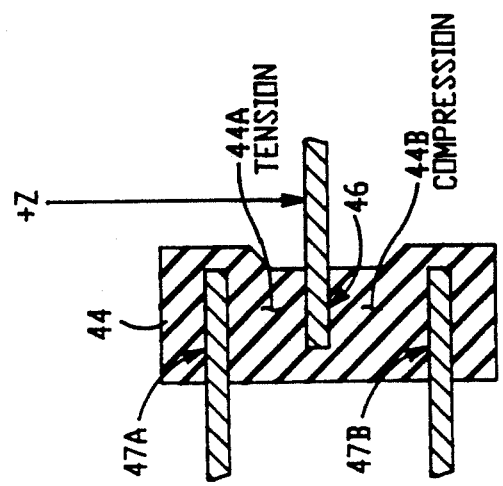
FIG. 4B is an enlarged view in side elevation and section of the FIG. 4A shock mount, shown in assembled state, the view being taken along the line 4B—4B in FIG. 4A.

As shown in FIG. 2, and better illustrated in FIG. 4, the disk drive 32 is mounted to two identical U-brackets 34a and 34b. One bracket 34a mounts to the front of the disk drive 32, while the other bracket 34b mounts to the rear of the disk drive 32. Screws 35 are used to secure the brackets to threaded openings conventionally provided for mounting on opposite sidewalls of the disk drive 32. A formed, lineally offset tab segment 36 of each bracket 34 fits over an aligned straight tab segment 37 of the other bracket 34 as shown in FIG. 2. As shown in FIGS. 4, 4A, and 4B, shock mounts 44 are provided at the four corners of the disk drive 32 via the U-brackets 34a and 34b. The shock mounts 44 are molded of a suitable highly elastomeric material, such as Sorbothane ™. Flanged mounting tabs 46 extend from the shock mounts 44 and enter mounting slots 48 formed on the inside of the back wall 28 and the front wall 30, as best seen in FIG. 6D. Shock mount tabs 47A and 47B extend from the top and bottom of the bracket 34 at each corner thereof. The shock mount 44 is molded so that the flanged mounting tab 46 is mounted midway between the shock mount tabs 47A and 47B, as best shown in FIG. 4B. This preferred mounting arrangement provides superior shock resistance over the prior art methods described in the referenced Blackborow et al. and Westwood et al. patents discussed above. In the new arrangement shown in FIG. 4, Z-axis forces cause the shock mount simultaneously to enter compression and tension stresses in response thereto, rather than shear stress. In the example given in FIG. 4B, a +Z shock force applied to the module 10 and through the flanged mounting tab 46 causes a bottom portion 44B of the shock mount to compress, while a top portion 44A of the shock mount is stretched in tension. A reverse direction force −Z causes the reverse reaction. The tension-compression stress response of the shock mount 44 results in superior shock mounting for the disk drive 32.

A flex cable assembly 38 extends from an edge connector of the disk drive 32 to a plug 39 which is generally aligned by an opening in the back wall 28 of the frame 16 as shown in FIG. 3. An elastomeric bumper 41 (shown in FIG. 2) secured to the inside of the bottom cover 14 at the vicinity of the plug 39 serves to guide the plug 39 and maintain it in a desired orientation. The back wall 28 also includes e.g. two plastic slides 40, the positions of which are sensed by the base unit when the module 10 is installed, thereby to establish predetermined operating parameters of the module 10 within the disk drive subsystem. Vent slots 42 are also defined through the back wall 28 to enable airflow to remove heat from the disk drive 32 by convection. An electrostatic discharge contact bracket 43 includes a wire conductor secured to the disk drive 32 by one of the printed circuit board mounting screws 45 thereof. The contact bracket 43 fits into a well 51 defined in the backwall 28 of the frame 16 (see FIGS. 2 and 6D) and thereby contacts a guide pin of the base unit before any signal and power conductor pins come into contact with the signal plug 39 as the module 10 is loaded into the base unit by its loading mechanism.

Figure 6E:
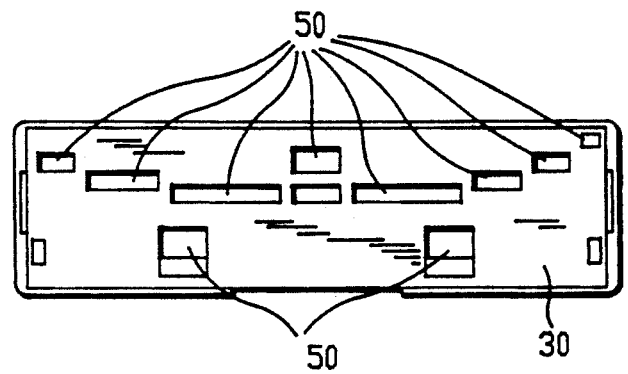
FIGS. 6A, 6B, 6C, 6D and 6E are respectively top plan, right side, left side, bottom plan, and front panel views of a molded plastic frame of the FIG. 1 module.
Figure 6D:
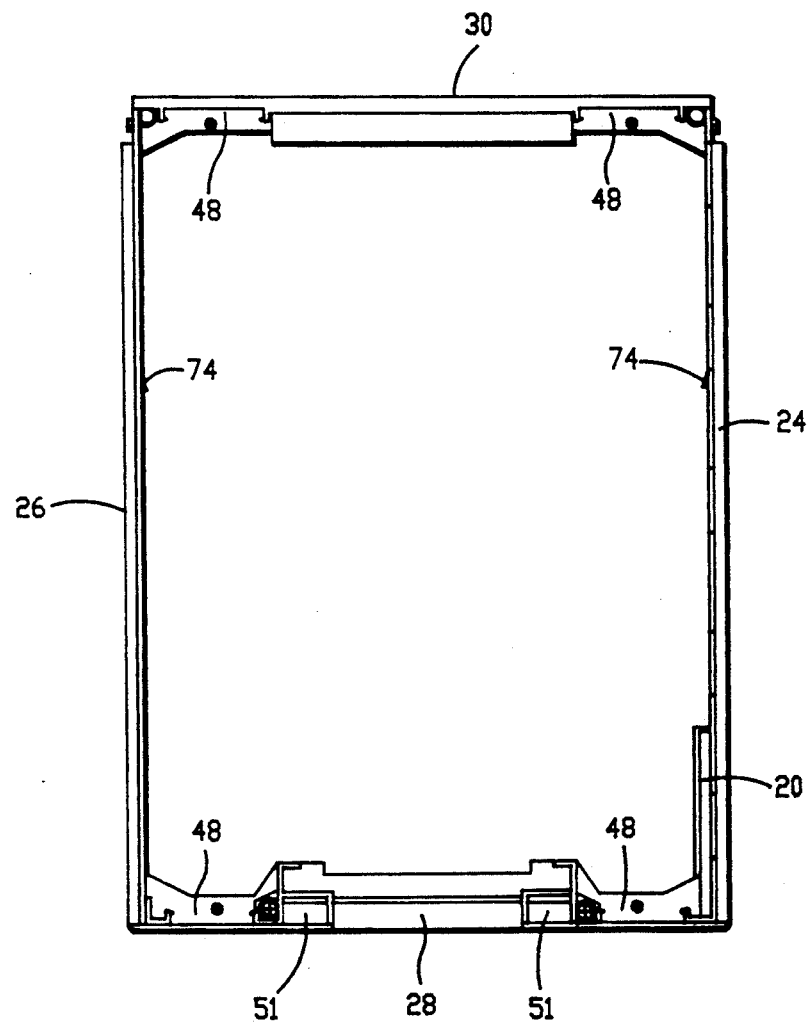
Figure 6C:
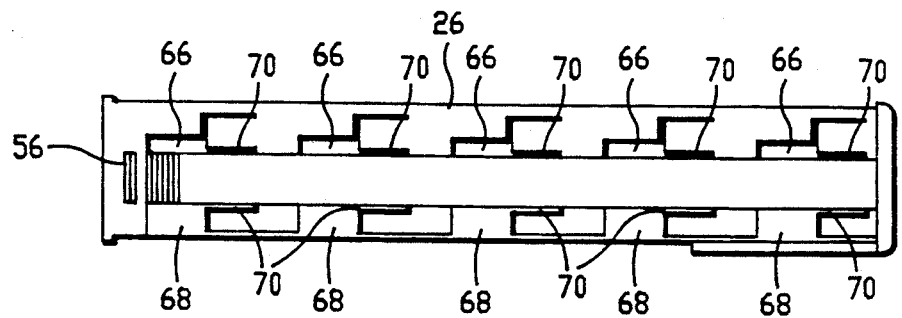
Figure 6A:
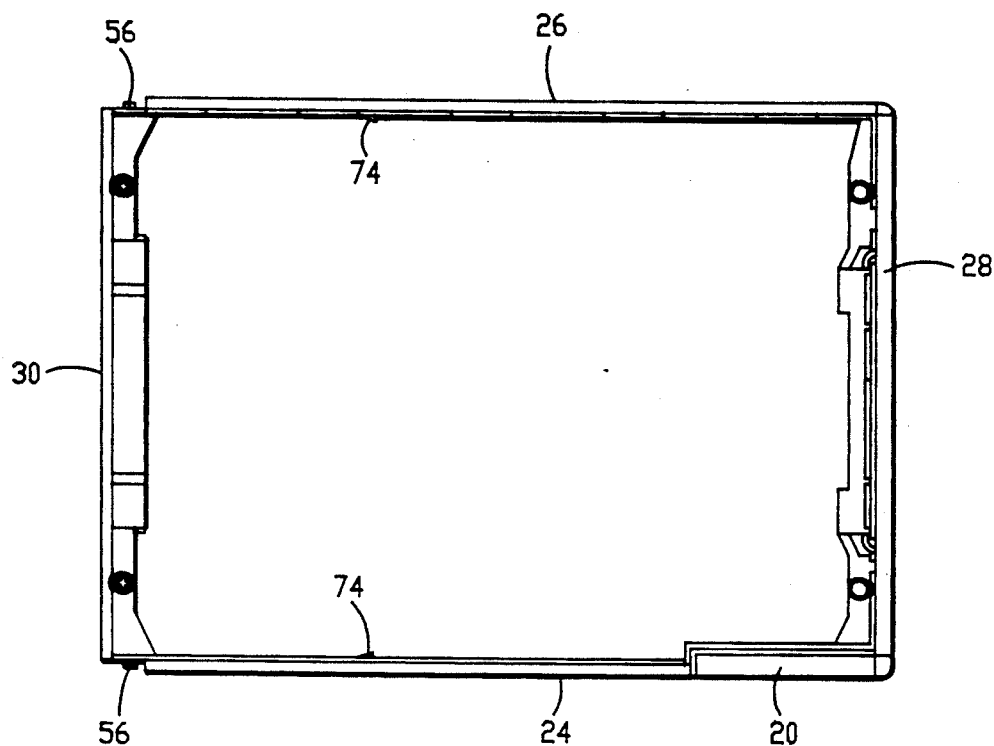
Figure 6B:
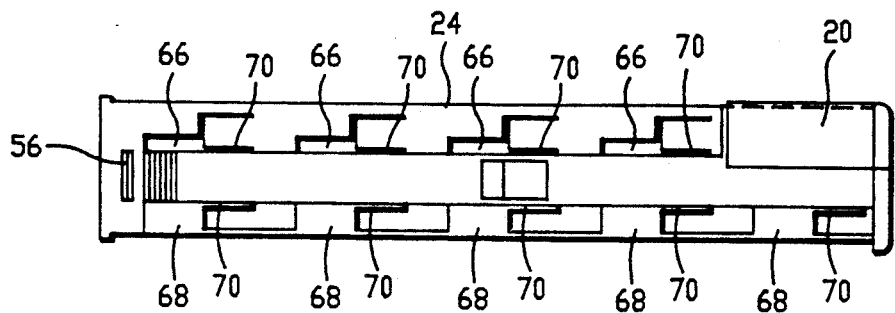

The front wall 30 defines a series of rectangular openings 50 sized and arranged as shown in FIG. 6E. These openings 50 are for receiving upper lock tabs 52 and lower lock arms 54 of the front cover 18, FIG. 5B. In addition, vertical rib projections 56 are defined on the sidewalls 24 and 26 as shown in FIGS. 6A, 6B and 6C. These ribs 56 are engaged by slotted side arms 58 when the front cover 18 is snap-locked onto the front of the frame 16. Thus, snap-lock of the front cover 18 is achieved not only by the action of the upper lock tabs 52 and lower lock arms 54, but also by the rib projections 56 and slotted side arms 58. A series of vent slots 60 are also defined in the front cover 18 in alignment with some of the rectangular openings 50 of the front wall 30 to facilitate airflow over heat-generating parts of the disk drive 32.

The top cover 12 and the bottom cover 14 are preferably formed of thin sheet metal in the shapes shown in FIG. 2. As formed, each cover 12, 14 defines flanges 62 on opposite sidewalls thereof. Extending from the flanges 62 are a series of spaced apart, L-shaped lock tabs 64. One row of tabs 64 of one of the flanges 62 engage enclosed slot openings 66 of a sidewall 24, 26, while the opposite row of tabs 64 of a particular cover engage open slot openings 68 of the opposite sidewall 26, 24.

Figure 7:
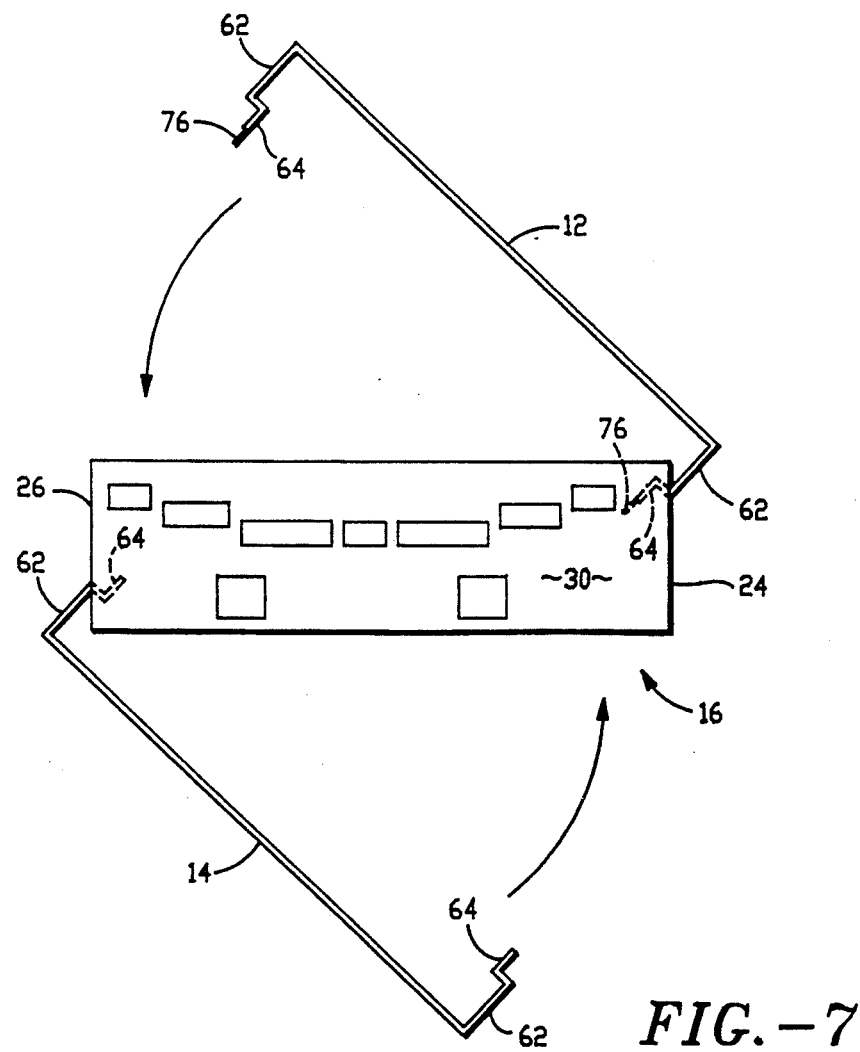
FIG. 7 is a somewhat diagrammatic view of the FIG. 1 module showing rotational insertion and initial attachment of the top and bottom covers to sides of the molded plastic frame of the FIG. 1 module.

As shown in FIG. 7, a cover 12, 14 has one row of tabs 64 inserted into aligned enclosed slot openings 66 of each sidewall 24, 26 in a first installation step. After the first rows of the cover tabs 64 are inserted into the enclosed slot openings 66, these tabs act as hinges as the covers 12 and 14 are then rotated toward the frame 16. The other rows of tabs 64 of the covers 12 and 14 then pass through the open slot openings 68, as shown in the cut-away portion of FIG. 8.

After the covers 12 and 14 are properly seated onto the frame 16, they are moved toward the backwall 28 for a short distance. This lineal movement of the covers 12 and 14 relative to the frame 16 causes the tabs 64 to become locked in locking slit portions 70 of both the enclosed slot openings 66 and the open slot openings 68 of the sidewalls 24 and 26. In order to latch e.g. the top cover 12 in place to prevent inadvertent removal, two latch ramps 74 are formed on the inside of the sidewalls 24 and 26, as shown in FIGS. 2, 6A and 6D. Also, one of tabs 64 of each flange 62 of the top cover 12 includes an extension portion 76. This extension portion is cammed by an associated ramp during the movement of the top cover 12 toward the backwall 28 until the ramp is just passed. At this point, the extension portion snap-locks to the inwardly extending back portion of the ramps 74 thereby latching the top cover 12 in place.

Figure 8:
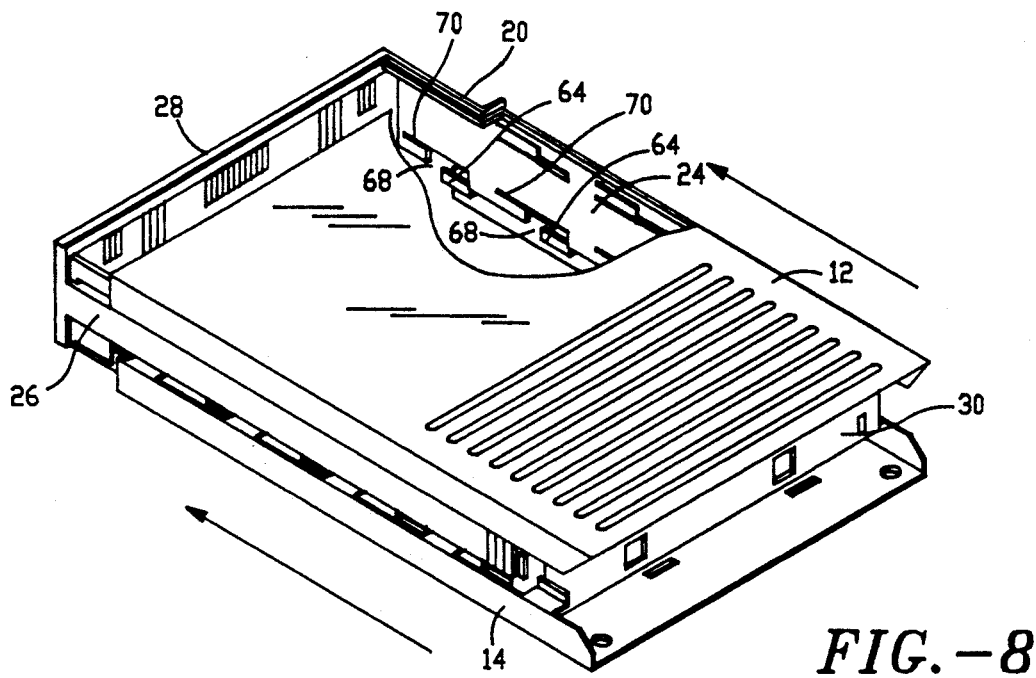
FIG. 8 is a somewhat diagrammatic isometric view of the FIG. 1 module illustrating a rearward displacement of the top and bottom covers for securing them to the plastic frame in latched engagement therewith prior to lockup of the FIG. 1 module resulting from insertion of the FIG. 5 front bezel locking bracket as suggested by FIG. 2. A portion of the top cover is broken away to illustrate engagement of the bottom cover with the frame.

Thus, when the covers 12 and 14 are displaced lineally as suggested in FIG. 8, the covers become secured in place and the top cover 12 becomes latched in place. When the front cover 18 is thereafter snap-locked in its place, reverse lineal displacement of the covers 12 and 14 is precluded, and the module 10 is fully assembled. If desired, mounting screws 72 may be provided to lock e.g. the bottom cover 14 to the frame 16.

Thus, the present module 10 accomplishes all of the objects of the present invention by providing a rugged, reliable mounting and housing for a fixed disk drive in a manner which does not require use of special tools, adhesives, or other materials, and which enables the user to gain access to the disk drive 32 to inspect or change jumper settings, or even to swap one disk drive module 32 for another, should that be desired.

Having thus described an embodiment of the invention, it will now be appreciated that the objects of the invention have been fully achieved, and it will be understood by those skilled in the art that many changes in construction and widely differing embodiments and the description herein are purely illustrative and are not intended to be in any sense limiting.

What is claimed is:

1. A fixed disk drive module containing a low profile fixed disk drive, comprising:
   mounting means mounting the fixed disk drive within the module,
   frame means defining contiguous walls of the module including oppositely facing sidewalls each defining a longitudinal row of enclosed cover slot openings having receiving portions and latching portions and a longitudinal row of open cover slot openings including entry portions and latching portions, the mounting means being attached to the frame means inside the contiguous walls thereof, a top cover means mounted on the frame means and including two peripheral flanges each defining a series of locking tab formations, one series being sized and aligned to mate in a hinging relation with corresponding ones of the enclosed cover slot openings and the other series being sized and aligned to enter said open cover slot openings after the top cover means has been rotated toward the frame means during an initial phase of a top cover means attachment operation, a bottom cover means mounted on the frame means and including two peripheral flanges each defining a series of locking tab formations, one series being sized and aligned to mate in a hinging relation with corresponding ones of the enclosed cover slot openings and the other series being sized and aligned to enter said open cover slot openings after the bottom cover means has been rotated toward the frame means during an initial phase of a bottom cover means attachment operation, said locking tab formations of the top cover means and the bottom cover means adapted to enter and engage said latching portions as said cover means are longitudinally displaced relative to said frame means to an enclosure position during a final phase of the top cover means attachment operation and during a final phase of the bottom cover means attachment operation.

2. The fixed disk drive module set forth in claim 1 wherein said frame means is a unitary structure of molded plastic material.

3. The fixed disk drive module set forth in claim 1 wherein said frame means defines a plurality of tab receptacle structures on inside sidewalls thereof, and wherein the mounting means comprises mounting bracket means secured to the fixed disk drive and having tab formations engaging the tab receptacle structures, said mounting bracket means including shock mounting means between a bracket portion thereof and said tab formations.

4. The fixed disk drive module set forth in claim 3 wherein a said tab formation is mounted to the shock mounting means intermediate the bracket portion, so that the shock mounting means responds by simultaneous tension and compression stress reaction to forces applied to the module in a direction generally normal to a plane containing a data storage surface of the fixed disk drive mounted therein.

5. The fixed disk drive module set forth in claim 3 wherein said bracket portion of said mounting bracket means comprises a U-shaped bracket secured to a said sidewall.

6. The fixed disk drive module set forth in claim 1 further comprising front cover means attached to the frame means so as to secure the top cover means and the bottom cover means at said enclosure position and including locking means for snap locking to the frame means.

7. The fixed disk drive module set forth in claim 2 wherein the front cover means is a unitary structure of molded plastic material.

8. The fixed disk drive module set forth in claim 7 wherein a front wall of the frame means defines a plurality of cover lock openings and the locking means of the front cover means includes a plurality of aligned locking tab projections projecting through the cover lock openings and latching thereto.

9. The fixed disk drive module set forth in claim 7 wherein the locking means of the front cover means includes locking endwall projections for locking to locking ribs defined on exterior sidewall surfaces of the frame means adjacent to the front cover means.

10. The fixed disk drive module set forth in claim 7 wherein a front wall of the frame means defines a plurality of cover lock openings and the locking means of the front cover means includes a plurality of aligned locking tab projections for projecting through the cover lock openings and latching thereto, and further comprises locking endwall projections locking to locking ribs defined on exterior sidewall surfaces of the frame means adjacent to the front cover means.

11. The fixed disk drive module set forth in claim 1 wherein the locking tab formations of said cover means comprise a series of inwardly projecting L-shaped segments extending from said flanges in a spaced apart arrangement.

12. The fixed disk drive module set forth in claim 1 wherein at least one of said top cover means and said bottom cover means includes latching means and wherein said frame means defines a latching structure means, the latching means of said one engaged with said latching structure means at said enclosure position.

13. The fixed disk drive module set forth in claim 12 wherein said latching means comprises an extension formation on at least one of said locking tab formations, and wherein said latching structure means includes ramp means defined on an inside surface of a said sidewall.

14. The fixed disk drive module set forth in claim 1 wherein the top cover means and the bottom cover means further comprise thin sheet metal material.

15. The fixed disk drive module set forth in claim 1 wherein a backwall portion of the frame means includes an electrical connection means, and further comprising electrostatic discharge contact means connected to said fixed disk drive and positioned in a well defined by said backwall portion so as to engage a plug-registration pin of a base unit before electrical connection is made with the electrical connection means of said module.

16. A shock mounted disk drive assembly comprising a disk drive mounted by shock mounting means within a removable fixed disk module, a frame means defining contiguous side walls having a plurality of spaced apart tab receptacle structures on inside portions thereof, and cover means engaging the frame means for covering openings surrounded by said contiguous side walls of the module, mounting bracket means secured to the disk drive and having a plurality of shock mounts positioned to engage the tab receptacle structures, each shock mount including a viscoelectric material and an L-shaped mounting structure, one leg thereof being embedded in and extending outwardly from the viscoelastic material and another leg forming a mounting tab, each of the plurality of tab receptacle structures receiving one of the plurality of mounting tabs along a locus substantially perpendicular to a plane containing a data storage surface of the disk drive, the shock mounts providing simultaneous tension and compress stress reaction to forces applied to the module in a direction generally normal to the plane.

17. The disk drive assembly set forth in claim 16 comprising four tab receptacle structures located generally adjacent to four corners of said frame means.

18. A disk drive assembly for a generally flat, rectangular box-shaped disk drive module including a hard disk drive mechanism, the disk drive assembly including a continuous frame having oppositely facing sidewalls and oppositely facing front and rear endwalls, the hard disk drive mechanism being mounted in a space enclosed by the frame, each sidewall defining along one edge a series of spaced apart, slotted openings and adjacent slot portions, and along another edge a series of spaced apart slots, the slotted openings and slots of one sidewall facing slots and slotted openings respectively of the other sidewall, a top cover and a bottom cover mounted on the frame and having oppositely facing longitudinal flanges formed to overlie an edge region of the slotted sidewalls, each flange having a series of generally L-shaped lock tabs depending outwardly therefrom, the tabs of one flange being seated in the slot portions of the spaced apart slotted openings of one sidewall and the tabs of the other flange of the said cover being seated in the slots of the other sidewall, whereby longitudinal displacement of each one of the covers relative to the frame and subsequent rotation of that one cover relative to the frame along an axis aligned with the slots of the other sidewall enables that one cover to be detached and removed from the frame.

19. The disk drive assembly set forth in claim 18 further comprising a front cover attached to the front endwall of the frame and including outer locking side arms having locking formations for snap locking to complementary locking formations of the frame, so that when the top cover and the bottom cover are attached to the frame, the front cover locks the top and bottom covers to the frame.

20. The disk drive assembly set forth in claim 19 wherein the front endwall defines a series of openings, and wherein the front cover includes a series of locking tabs alinged with the series of openings and locking the front cover to the front endwall.

21. The disk drive assembly set forth in claim 19 wherein the front cover is a unitary structure of molded plastic material.

22. The disk drive assembly set forth in claim 18 further comprising shock mounting means shock mounting the hard disk drive mechanism to the frame.

23. The disk drive assembly set forth in claim 22 wherein the shock mounting means comprises a plurality of shock mounts including an outer carrier, a viscoelastic material suspended across a gap defined by the carrier and a member embedded in a central portion of the viscoelastic material, so that the shock mount responds by simultaneous tension and compression stress reaction to forces applied to the module in a direction generally normal to the gap.

24. The disk drive assembly set forth in claim 23 wherein the plurality of shock mounts comprises four shock mounts attached adjacent to four outside corners of the hard disk drive mechanism and to four respectively adjacent inside regions of the frame adjacent to the inside corners thereof.

25. The disk drive assembly set forth in claim 24 wherein the frame defines a plurality of tab receptacle structures at the adjacent inside regions, and wherein the mounting brackets have tab formation engaging the tab receptacle structures.

26. The disk drive assembly set forth in claim 18 wherein the frame is a unitary structure of molded plastic material.

27. The disk drive assembly set forth in claim 18 wherein an inside sidewall of the frame defines at least one latching ramp and further comprising a latching finger extending outwardly from one of the L-shaped lock tabs and engaging the latching ramp.

28. The disk drive assembly set forth in claim 18 wherein the top cover and the bottom cover are further comprise thin sheet metal material.

29. The disk drive assembly set forth in claim 18 wherein the rear endwall defines an opening and further comprising an electrical connection means facing outwardly through the opening, and wherein the opening is slightly larger than the electrical connection means so that the electrical connection means floats in the space defined by the opening, thereby to facilitate electrical interconnection with a mating plug of a receptable unit for receiving the module.

* * * * *